Figure 1:
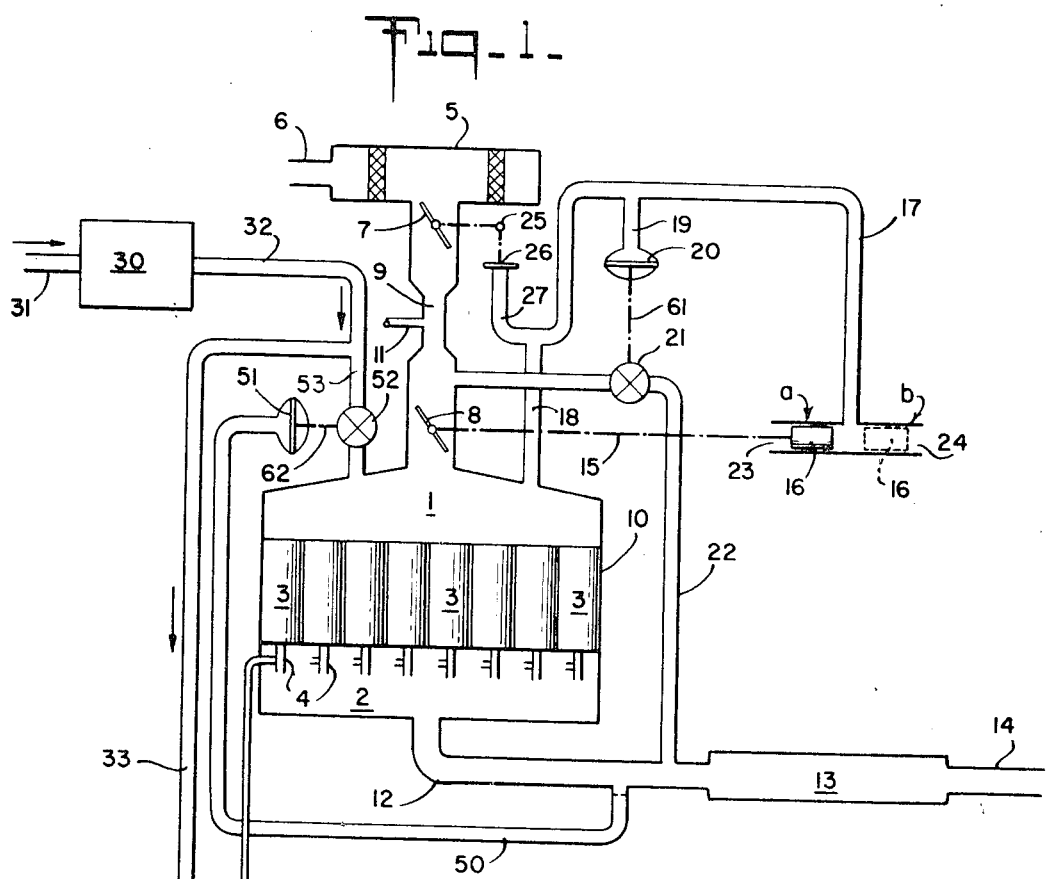

United States Patent
Kraus et al.

[15] 3,641,767
[45] Feb. 15, 1972

[54] LOW-POLLUTING INTERNAL COMBUSTION ENGINE WHEREIN SECONDARY AIR IS UTILIZED TO PREVENT OVERHEATING OF THE EXHAUST MANIFOLD

[72] Inventors: Bernhard J. Kraus, Roma-Ostia, Italy; Dae Sik Kim, Maplewood, N.J.

[73] Assignee: Esso Research and Engineering Company

[22] Filed: Feb. 12, 1970

[21] Appl. No.: 10,904

[52] U.S. Cl..............................60/30, 123/119 D, 123/124
[51] Int. Cl.............................................................F01n 3/10
[58] Field of Search..............60/30; 123/119 D, 119 DB, 124

[56] References Cited

UNITED STATES PATENTS

| | | | |
|---|---|---|---|
| 3,059,419 | 10/1962 | Schnabel | 60/30 |
| 3,360,927 | 1/1968 | Cornelius | 60/30 |
| 3,364,909 | 1/1968 | Mick | 60/30 |

*Primary Examiner*—Douglas Hart
*Attorney*—Manahan and Wohlers and Joseph J. Dvorak

[57] ABSTRACT

Low-polluting internal combustion engine wherein means are provided to inject secondary air in a pulsed manner to the exhaust ports of the cylinders when these ports are open to permit the ejection of exhaust gases. Particular features comprise controlling these pulses with respect to the shape of pulse, duration of pulse and timing of the pulse with the cycle of the engine. A particular feature comprises the control of the temperature in the exhaust manifold or reactor. During normal engine operation, the temperature can be maintained within the desired range by controlling the engine carburetion. Further, to protect from overheating the reactor(s) during a sustained high-power operation, an automatic leaning of the carburetor mixture by the introduction of additional atmospheric air into the intake manifold by particular mechanical means is provided.

5 Claims, 3 Drawing Figures

PATENTED FEB 15 1972 3,641,767

INVENTORS
BERNHARD J. KRAUS
DAE SIK KIM
BY W. O. Heilman
ATTORNEY

LOW-POLLUTING INTERNAL COMBUSTION ENGINE WHEREIN SECONDARY AIR IS UTILIZED TO PREVENT OVERHEATING OF THE EXHAUST MANIFOLD

The present invention is concerned with a low polluting internal combustion engine whereby objectionable compounds such as nitrous oxides, carbon monoxide and unburned hydrocarbons are minimized in the exhaust gases. These objectionable compounds are minimized by means whereby exhaust gases are recycled to the engine only when the throttle is intermediate the idle position and the full throttle position and when the engine is not being choked. These objectionable constituents are also greatly minimized by the introduction of controlled pulsed air stream into the exhaust ports at points adjacent to the exhaust valves when these exhaust valves are open. Furthermore, undesirable overheating of the exhaust manifold under certain conditions is prevented by introducing additional air into the intake manifold when the pressure in the exhaust manifold remains at a predetermined figure for a predetermined duration.

The major gaseous pollutants from automobile engines include unburned hydrocarbon, carbon monoxide and oxides of nitrogen. The first two are results of incomplete combustion of the fuel due either to lack of oxygen or to lack of time required to complete the combustion reaction. Since the combustion reaction in an engine is contained and the containing wall must be cooled to protect the metal wall, the incomplete combustion is inevitable in the cylinder. Therefore, an afterburning reaction is required in order to maintain these two pollutants below certain levels. The oxygen for this purpose can be supplied either by lean operation or by secondary injection of air. The smooth operation of the engine and the fueling of after burning not only prefers, but also requires rich operation. When very low levels of these pollutants are desired, it is necessary to inject secondary air.

The oxides of nitrogen are formed in a flame where an efficient combustion reaction is occurring. The high-power and high-efficiency operation causes higher formation of oxides of nitrogen ($NO_x$). Any method of $NO_x$ suppression causes loss of volumetric efficiency of the engine. Rich operation up to 20 percent extra fuel and exhaust recycle up to 15 percent does not drastically affect the desired aspects of the engine operation with respect to power level and fuel efficiency, but does result in about 80 to 90 percent reduction in undesirable $NO_x$ formation.

Thus, among the objectionable constituents of exhaust gas are carbon monoxide, unburned hydrocarbons, and oxides of nitrogen which are very undesirable from an air pollution standpoint. Carbon monoxide is harmful for its toxic properties and the oxides of nitrogen are physiologically harmful. Hydrocarbons and oxides of nitrogen are additionally harmful, even though present in very small amounts since they participate in a sequence of photochemical reactions which cause eye-irritation, crop-damaging and visibility-reducing smog. These problems become acute in urban areas where local meteorological conditions prevent the normal upward convective movement of ground level air for long time periods.

Figure 2:
Figure 3:
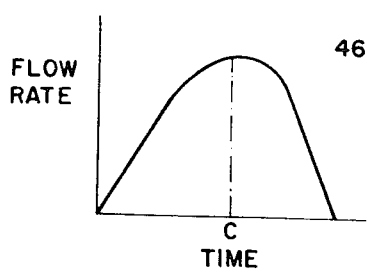

The present invention greatly reduces these objectionable constituents in a manner that will be more clearly understood by reference to the drawings illustrating adaptations of the same. FIG. 1 is a diagrammatical sketch of an eight cylinder internal combustion engine. FIG. 2 illustrates one pulse programming means of securing controlled pulsed air flow to the exhaust ports of the respective cylinders while FIG. 3 illustrates the flow rate or shape of pulses to these exhaust ports as a function of time.

Referring specifically to FIG. 1, an internal combustion engine 10 is shown containing an intake manifold 1, an exhaust manifold 2, and eight cylinders, one of which is designated as 3. Inlet ports of the respective cylinders communicating with the intake manifold are not shown but are of conventional design and operation. All cylinders contain conventional exhaust valves and ports, one of which of cylinder 3 is designated as 4. The engine also comprises an air filter 5, an air inlet conduit 6, a choke plate 7, and a flapper valve 8, all of which are conventional. Fuel is introduced into the carburetor 9 by means of line 11, the induction of which is secured by known means. The engine also comprises an exhaust pipe 12 leading into a muffler 13, which gases are vented to the atmosphere through exhaust conduit 14.

Flapper valve 8 is operated by conventional throttle means not shown. Flapper valve 8, in addition to conventional throttle means, has a suitable linkage means 15 which actuates a bleed valve 16 between the position shown in solid lines (a) and the position shown in dotted lines (b). Bleed valve 16 is in position (a) when flapper valve 8 is in the idling position while bleed valve 16 is in position (b) when flapper valve 8 is at full throttle.

Bleed valve 16 is at a position intermediate (a) and (b) in a manner to close the opening in line 17 and thus prevent bleeding of atmospheric air when flapper valve 8 is intermediate the idle position and the full throttle position. Under these conditions, when the engine is operating the vacuum in the intake manifold 1 is transmitted through line 18 through line 19 causing control membrane 20 to move upwardly in a manner to open valve 21 by means of linkage 61 and thus permit exhaust gases to recycle from exhaust line 12, through line 22, through valve 21 and be introduced at a point intermediate the point of fuel injection, line 11, and the flapper valve 8. When line 17 is closed due to bleed valve 16 being in an intermediate position, this will occur and exhaust gases will be recycled.

When flapper valve 8 is open to full throttle, valve 16 will move to position (b) and permit air to flow or bleed through port 23, flow through line 17 and thereby overcome the tendency or force of the vacuum in the intake manifold to move membrane 20 upwardly. Membrane 20 will move downwardly under the action, for example, of the spring loaded valve 21 which closes and prevents recycle of any exhaust gases. This will close conduit 22 and no recycle or gases will be secured from line 12. On the other hand, when flapper valve 8 is in the idling position of (a), air will flow or bleed through port 24 through line 17 and will also function to close valve 21 in a manner as described. Thus, recycle of exhaust gases is secured only when bleed valve 16 seals off line 17 at a position intermediate (a) and (b), namely between idling and full throttle.

A particular further feature of the present invention is the overriding effect of choke valve 7, even when bleed valve 16 seals off line 17. Choke valve 7 is connected by suitable linkage means 25 so as to open a port 26 in line 27 when the engine is choked. Thus, when the engine is being choked, atmospheric air will flow through port 26, through line 27, and overcome or negate the vacuum pressure from the intake manifold on membrane 20. Thus, membrane 20 is not subject to the suction of the intake manifold and valve 21 will close as described thereby preventing any recycle of exhaust gases. Thus, by the present mechanism recycle of exhaust gases is secured only intermediate idle throttle and full throttle and when the engine is not being choked.

A further feature of the present invention is the use of programmed pulsed air stream which is introduced into the system by means of a pump 30 or equivalent means which air enters from the atmosphere through line 31. This air flows through line 32, through line 33 to a pulse programming assembly means 40 suitably connected to the crankshaft by timing belt or gear assembly means 41. The particular programming assembly means 40 illustrated comprises a plurality of outlets or ports, one of which is designated as 42. Outlet 42 is in communication to exhaust port 4 of cylinder 3 by means of conduit 43. The number of outlets or ports on programming device 40 corresponds to the number of exhaust ports on the respective cylinders. While only one communication means 43 is shown, namely from port 42 to exhaust port 4, it is to be understood that all the ports of programming device 40 are suitably connected by suitable similar conduits to corresponding exhaust ports of all the respective cylinders. In operation, port 42 of programming device 40 is opened substantially concurrently when exhaust valve 4 of cylinder 3 is opened. For preferred operational results, the flow of air from port 42 should somewhat lead the start of the opening of the exhaust valve of port 4. A desired flow rate or pulse shape of air with respect to time is illustrated in FIG. 3.

The particular programming device 40 is illustrated in FIG. 2 wherein a rotating plate 44 contains a control port 45. Plate 44 is rotated by shaft 46 driven by assembly 41, preferably timed by the camshaft. As shown in FIG. 2, port 42 communicating with port 4 by means of line 43, is in full open communication with port 45 in rotating plate 44. Thus, the airflow rate to port 4 is full and is approximately position (c) of FIG. 3. Port 45 of plate 44 is of a sufficient diameter so that when port 42 is half closed by the rotating plate, port 45 will be in a position permitting flow of air through adjacent port 47 which port will communicate by suitable similar means to an exhaust port of the next cylinder. In essence, the control means 40 is designed to have a continuous flow of air from the interior of means 40 substantially equivalent to the flow of air volume when port 45 is in full communication with port 42.

A further feature of the present invention is that it is very desirable that the exhaust manifold 2 be operated at a relatively high temperature, namely in the range of about 1,500° to about 1,800° F. The conversion rate of carbon monoxide to carbon dioxide drops sharply below 1,500° F., thus it is desirable to maintain the reactor or exhaust manifold temperature above this value. Although high reactor temperatures are generally desired for high rate of conversion and thus lower final pollutant level, two practical aspects limit the upper temperature to about 1,800 ° F. These are working temperatures of available reactor materials and the extent of richness or excess fuel which can be afforded to heat the exhaust to this temperature level and subsequently be wasted.

These temperatures are secured by a number of means, as for example, by insulation. The exhaust manifold in essence becomes a reactor at these temperatures for the substantial complete fuel conversion of unburned hydrocarbons and carbon monoxide to innocuous materials. However, if the engine should be operating for a substantial length of time, at high power levels, the temperature in the exhaust manifold or reactor 2 will tend to build up with the possibility of burning out the element. Under these conditions, pressure will build up in exhaust pipe 12. In accordance with the present invention, this pressure is transmitted by suitable means through conduit 50 to a control membrane 51 which actuates to open or close by suitable linkage 62 a control valve 52 positioned in line 53. As the pressure builds up on membrane control 51, this will open valve 52 permitting air to flow through line 32, through line 53 through valve 52 into the intake manifold 1 in a manner to lean the carbureted mixture entering the intake manifold from the carburetor. This will reduce the temperature and at a predetermined level and at a predetermined pressure will allow spring or otherwise actuated valve 52 to close.

Thus, suppression of unburned hydrocarbons and carbon monoxide is carried out in an exhaust manifold reactor. For a V-8 engine, two reactors are used. AS heretofore pointed out, the proper operation of the reactors, high temperatures in the range of about 1,500° to about 1,800° F. are required. The function of the secondary programmed pulsed air is to ensure the mixing of the secondary air and the rich exhaust before they enter into the exhaust reactors. This further ensures the effective utilization of the whole reactor volume, uniform optimum mixture ration, high mixture temperature, and the minimum excess secondary air. Thus, the programmed pulsed air injection is essential when very low pollutant levels are desired.

The presence of excess fuel and the resulting reducing gases in a rich engine operation tend to capture and minimize the oxygen needed for the formation of $NO_x$. The partial recycling of exhaust gas suppresses the peak flame temperature. Both of these methods tend to suppress the $NO_x$ formation. The combination of these two methods do not affect the operation of engine and their effect are near additive.

It has been known in the art that the amount of exhaust recirculation should be a constant fraction of the engine air intake. This is usually accomplished by the use of complex recycle valves which are generally not reliable. The usual method of injection is into the intake manifold. The present invention involves introduction of the recycle at a point before the throttle plate but after the fuel inlet. Since the pressures at these points are always near ambient, no special control valves are required to proportion the exhaust stream for recycle. Contrarily in the usual means of injection into the intake manifold, a special and complex valve must function to maintain proportional recycle against the widely varying pressure difference between exhaust and intake.

When recycling exhaust gases between idle and full throttle, the precise limitations will depend upon various operating conditions including the particular engine design. While an off-on type of recycle may be employed, it is preferred to have a gradual increase and decrease of the quantity of exhaust gases recycled between idle throttle and full throttle. This is secured by the particular apparatus illustrated. Under these conditions, at maximum recycle flow, about 10 to 15 percent by volume of exhaust gases are recycled based upon the total volume of gases introduced into the intake manifold. Generally speaking, exhaust gases will not be recycled when the throttle is opened only about 0 to 10 percent of full throttle and when the throttle is open, about 90 to 100 percent of full throttle. Thus, gases will be recycled only when the throttle is open in the range from about 10 to 90 percent.

The quantity of air introduced into the intake manifold in order to lean the mixture generally is in the range from about 10 to 20 percent by volume based upon the total volume of gases introduced into the intake manifold. The amount of secondary air introduced to the exhaust ports is in the range of about 10 to 30 percent by volume based on total volume of gases exhausted from the cylinder.

What is claimed is:

1. In an internal combustion engine including an intake manifold and an exhaust manifold wherein carbureted fuel is introduced into said intake manifold for combustion and wherein secondary air is introduced into the exhaust manifold in a manner to combust unconverted hydrocarbons and convert CO to $CO_2$, the process of preventing undue temperature rise in said exhaust manifold which comprises transmitting the pressure rise in said exhaust manifold due to temperature rise to control means in a manner to introduce additional secondary air directly into the intake manifold wherein said secondary air mixes with the carbureted incoming fuel mixture to lean the same.

2. Process as defined by claim 1 wherein the amount of secondary air introduced is in the range of about 10 to about 20 percent by volume based upon the total volume of carbureted fuel introduced into the intake manifold.

3. Assembly to be affixed to a conventional internal combustion engine including an intake manifold and an exhaust manifold, said assembly designed, for preventing undue temperature rise in an exhaust manifold when secondary air is introduced into said exhaust manifold to burn unburned constituents which comprises: (1) a first conduit extending from the exhaust of said engine to; (2) a valve control means; (3) a second conduit extending from the atmosphere into the intake manifold of said engine; (4) a valve in said second conduit adapted to open or close; and (5) linkage means extending from said valve control means to said valve.

4. Assembly as defined by claim 3 wherein said valve control means comprises a flexible membrane adapted to open said valve at a predetermined pressure and to close said valve at a predetermined pressure.

5. Assemble as defined by claim 3 wherein said valve control means progressively opens and closes said valve.

* * * * *